(12) United States Patent
Popielas et al.

(10) Patent No.: US 7,310,993 B2
(45) Date of Patent: Dec. 25, 2007

(54) PRESSURE SENSOR APPARATUS FOR MEASURING PRESSURES INCLUDING KNOCK CONDITIONS IN ENGINE CYLINDERS

(75) Inventors: Frank W. Popielas, Plainfield, IL (US); Howard M. Robins, Buffalo Grove, IL (US); Jeffery A. Foster, North Aurora, IL (US); James S. Pietraski, Plainfield, IL (US); Lawrence E. Peck, Wadsworth, IL (US); James T. Mikos, Westchester, IL (US)

(73) Assignee: Dana Corporation, Toledo, OH (US)

( * ) Notice: Subject to any disclaimer, the term of this patent is extended or adjusted under 35 U.S.C. 154(b) by 182 days.

(21) Appl. No.: 10/504,372

(22) PCT Filed: Feb. 14, 2003

(86) PCT No.: PCT/US03/04671

§ 371 (c)(1),
(2), (4) Date: Feb. 15, 2005

(87) PCT Pub. No.: WO03/071119

PCT Pub. Date: Aug. 28, 2003

(65) Prior Publication Data

US 2005/0126262 A1 Jun. 16, 2005

Related U.S. Application Data

(63) Continuation-in-part of application No. 10/077,411, filed on Feb. 15, 2002, now Pat. No. 6,701,775.

(60) Provisional application No. 60/396,532, filed on Jul. 16, 2002.

(51) Int. Cl.
*G01L 23/22* (2006.01)

(52) U.S. Cl. .................................... 73/35.12; 73/115
(58) Field of Classification Search ............... 73/35.07, 73/35.09, 35.12, 115, 705, 715
See application file for complete search history.

(56) References Cited

U.S. PATENT DOCUMENTS

| 4,393,687 A | 7/1983 | Muller et al. |
| 4,822,294 A | 4/1989 | McClearn |

(Continued)

OTHER PUBLICATIONS

International Search Report dated Feb. 14, 2003 for application No. PCT/US03/04671.

*Primary Examiner*—John E. Chapman
(74) *Attorney, Agent, or Firm*—Marshall & Melhorn LLC (57) ABSTRACT

Sensor apparatus for a multiple layer steel (MLS) cylinder head gasket measures combustion pressures for detecting engine conditions. A membrane is positioned at one end of an elongated metal tube, and the membrane end of the tube engages a cylinder bore boundary. A fiber optical sensor apparatus is fixed within the tube, and communicates with cyclic combustion events via the membrane. In one disclosed embodiment, optical wires from sensor apparatus situated at each engine bore are bundled into a common groove machined into an extended spacer layer radially outwardly of the conventional boundary of the gasket. The tube protects the sensor apparatus from damage of sealing stress on the gasket, and particularly at the bore perimeter. Each tube lies in a separate groove in the spacer layer that terminates at the bore boundary. A converter changes optical signals received from the apparatus into electrical signals for transmittal to a controller.

13 Claims, 7 Drawing Sheets

U.S. PATENT DOCUMENTS

| | | |
|---|---|---|
| 5,195,365 A | 3/1993 | Chujo et al. |
| 5,380,014 A | 1/1995 | Schaperkotter |
| 5,495,137 A | 2/1996 | Park et al. |
| 5,529,346 A | 6/1996 | Sperring |
| 5,659,132 A | 8/1997 | Novak et al. |
| 5,938,963 A | 8/1999 | Tanis |
| 6,131,465 A | 10/2000 | Wlodarczyk et al. |
| 6,161,520 A | 12/2000 | Clarke |
| 6,532,737 B1 | 3/2003 | Kozerski et al. |
| 6,945,117 B2 * | 9/2005 | Boyd et al. ................ 73/729.1 |

* cited by examiner

PRESSURE SENSOR APPARATUS FOR MEASURING PRESSURES INCLUDING KNOCK CONDITIONS IN ENGINE CYLINDERS

RELATED APPLICATIONS

This application claims priority under Title 35, USC Section 119(e) of U.S. Patent Application No. 60/396,532 filed on Jul. 16, 2002 which is incorporated by reference in its entirety. This application also claims priority under Title 35, USC Section 120 of U.S. patent application Ser. No. 10/077,411 (now U.S. Pat. No. 6,701,775), filed on Feb. 15, 2002, of which the present application is a continuation-in-part, which is incorporated by reference in its entirety.

BACKGROUND OF THE INVENTION

1. Field of the Invention

The present invention relates generally to an apparatus embedded in and or applied to gasket structures, and more particularly to a sensing apparatus applied to combustion gaskets of internal combustion engines. More specifically, the invention relates to a pressure sensing apparatus provided within structures of multi-layered steel combustion gaskets for measuring pressure levels of combustion gases within the cylinder bores of internal combustion engines.

2. Description of the Prior Art

It is known to employ electronic sensors in gaskets for sealing between engine components including, for example, the block and cylinder head of a multi-cylinder internal combustion engine. In one case, the gasket comprises a sealing plate having several combustion chamber orifices, with combustion chamber sealing elements situated on the edges of the sealing plate surrounding the combustion chamber orifices. The gasket includes sensor elements for cylinder-specific detection of sealing movements perpendicular to the plane of the sealing plate, caused by pressure changes in respective combustion chambers being measured. All of the sensor elements are arranged outside of the combustion chamber sealing elements, and can be piezoelectric and piezoresistive, as well as glass fiber light guide-style sensors.

In another example, a gasket enclosed sensor system is employed for measurement of combustion chamber parameters and delivery of signals to points external of the engine. The gasket includes a combustion opening substantially surrounding a combustion chamber, and includes an access opening extending from the combustion chamber to a point external of the engine. A metallic sensor terminal is positioned within the access opening, and insulating material substantially surrounds the metallic sensor terminal.

In yet another example, a fluid sensor and associated circuitry are used to indicate presence of oil flow in a multi-cylinder internal combustion engine. The oil sensor includes a heating element positioned within the oil line, directly in the oil flow path. A comparator measures the value of signals from upstream and downstream heat sensors, and triggers a switching circuit when the temperature at the sensors approach one another to indicate an adequate oil flow to the engine.

In still another example, a gasket formed in the shape of an exhaust flange includes a load sensor comprising a pressure sensitive electrically resistive material positioned between electrodes and conductors extending outwardly of the perimeter of the gasket. A seal provided between first and second layers of the gasket, and about the load sensor, provides a seal for the electrodes, which are positioned in a cavity to protect the sensor from fluids.

SUMMARY OF THE INVENTION

A sensor for a multiple layer steel (MLS) cylinder head gasket aperture boundary is adapted to measure combustion pressures occurring in internal combustion engines for detection and control of engine knock, i.e. predetonation conditions, among other purposes. The structure of the sensor includes a pressure sensitive membrane at one end of a metal tube, wherein the tube is positioned adjacent a cylinder bore aperture boundary. The membrane is affixed to the tube at its aperture boundary end, and an optical sensor structure is fixed within the tube downstream of the membrane. The tube protects the optical sensor from becoming damaged under high sealing stresses that occur at the cylinder bore. As disclosed, the sensor is placed into a spacer layer of the MLS gasket, in a groove formed in at least one spacer layer, and an optical fiber wire coupled with a sensor from each cylinder bore is bundled into a common groove of the spacer layer. Various methods for forming the groove are available. The groove may be located outside of the conventional component boundary of the gasket. Thus, the spacer layer may be extended radially outwardly of the conventional component perimeter at the convenience of the gasket designer. Finally, a converter is employed to change optical signals received from the optical wire into electrical signals for appropriate transmittal to a microprocessor of an engine control unit.

Where a plurality of cylinder bores is provided in the gasket, and to the extent that pressure sensing is provided at each bore, a real time quality engine management control opportunity based upon cylinder-by-cylinder measurement of combustion pressure is provided. The specific cylinder-to-cylinder data can be input into an engine control unit module that includes systems for optimization of engine performance parameters, including fuel economy and emissions levels, among others.

As the pressure sensor apparatus is designed to be applied to a protective tube positioned in a groove of a spacer layer, the apparatus may be positioned between beaded or active layers of a multiple-layered steel gasket without severe risk of being crushed or overstressed. Various alternative embodiments for positioning the tube are disclosed. The sensor may also be positioned relatively close to the flame front within the gasket structure, and as such can be particularly effective to measure pressure levels of cylinder-specific combustion gases in real time.

DETAILED DESCRIPTION OF THE PREFERRED EMBODIMENTS

Figure 1:
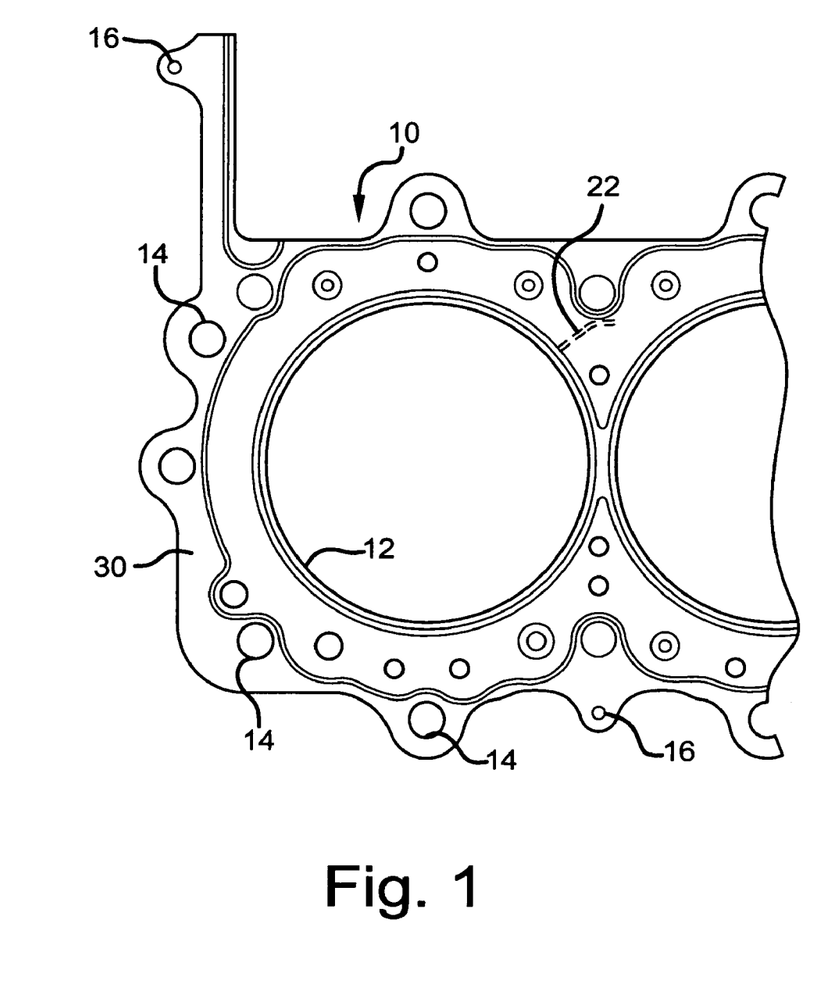
FIG. 1 is a fragmentary plan view of one described embodiment of a cylinder head gasket that incorporates the combustion pressure sensor system of the present invention, each sensor contained within a protective cylindrical metal tube disposed within a surface groove provided in a spacer layer of the gasket, and adapted to be positioned at the edge of an engine combustion aperture.

Referring initially to FIG. 1, one described embodiment of the pressure sensor apparatus of the present invention is herein described in detail. A combustion, or variously called cylinder head, gasket 10 is formed as a multiple layer steel (MLS) structure, and is of a type now commonly employed as combustion gaskets of internal combustion engines. The gasket 10 is shown only fragmentarily, and includes a plurality of combustion apertures 12, of which only one is shown and described herein. A plurality of bolt apertures 14, along with a plurality of other apertures not identified, appear about the periphery of the gasket as shown. Finally, a plurality of grommets 16 are positioned so as to hold the plurality of metal layers together.

Figure 2:
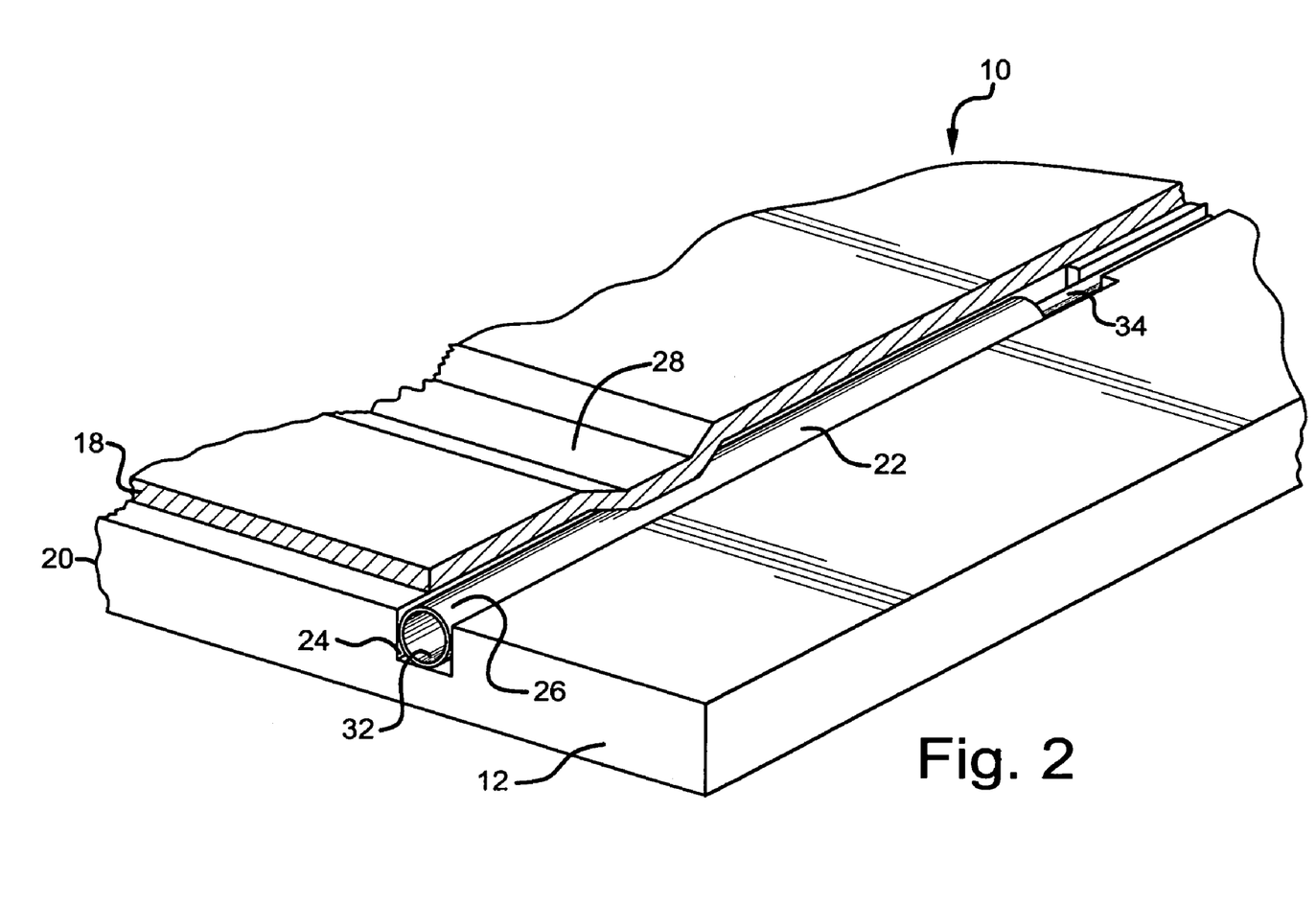
FIG. 2 is an enlarged perspective break-away view of a portion of the gasket of the present invention to reveal details of a groove provided in the surface of an MLS cylinder head gasket spacer layer, showing the protective metal tube positioned in the groove, wherein the top layer of the gasket has been cut back to reveal the tube.

Referring now also to FIG. 2, the MLS gasket 10 includes at least a pair of layers 18 and 20. The top layer 18 is a beaded active layer containing a metal bead 28, as will be appreciated by those skilled in the art. Typically, the layer 18 has a counterpart mirror image layer (not shown) that defines a bottom layer, i.e. one positioned beneath the layer 20, wherein the layer 20 acts as a non-beaded, non-active, spacer layer.

Figure 7:
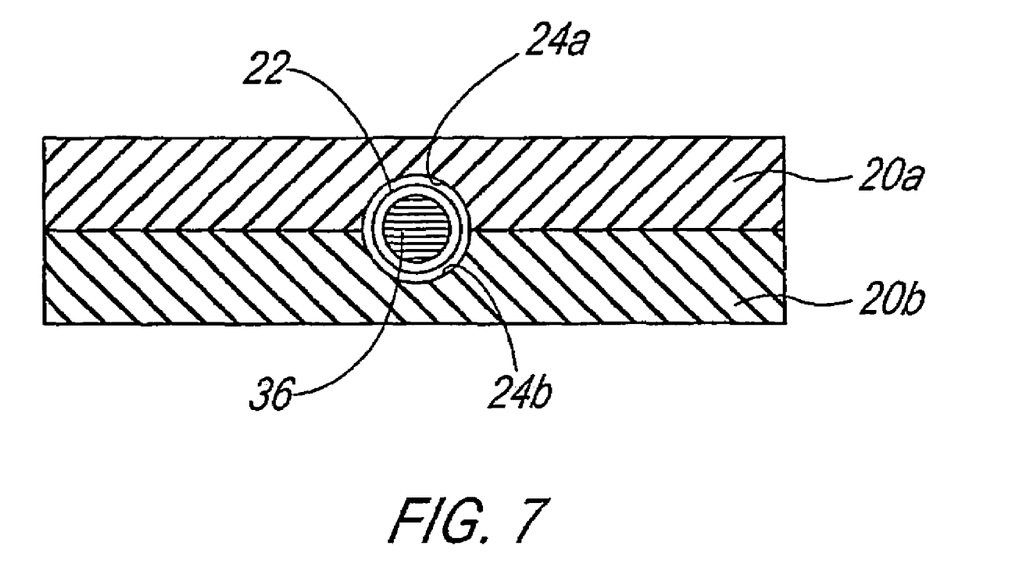
FIG. 7 is a cross-sectional view of an alternative embodiment of the groove for positioning the sensor apparatus.

A protective metal tube 22 lies in a groove 24 of the spacer layer 20 in a manner such that the groove 24 completely encases the metal tube 22, as shown. Alternatively, the grove 24 can be formed in both the spacer layer 20 as well as in the upper layer 18. For example, referring to FIG. 7, instead of a single spacer layer 20 being provided with a single groove 24 deep enough for holding metal tube 22, spacer layer 20 is split into two layers 20a and 20b that are positioned adjacent one another. Each of the layers 20a and 20b are provided with a groove 24a and 24b wherein the depth of each groove is preferably at least about half of the thickness of metal tube 22.

An end 26 of the tube 22 is positioned near the boundary of the combustion aperture 12. To the extent that only one end 30 of an elongated gasket 10 is depicted (FIG. 1), references to apertures 12 will be understood to extend beyond the single combustion aperture 12 depicted in FIG. 1.

Figure 3:
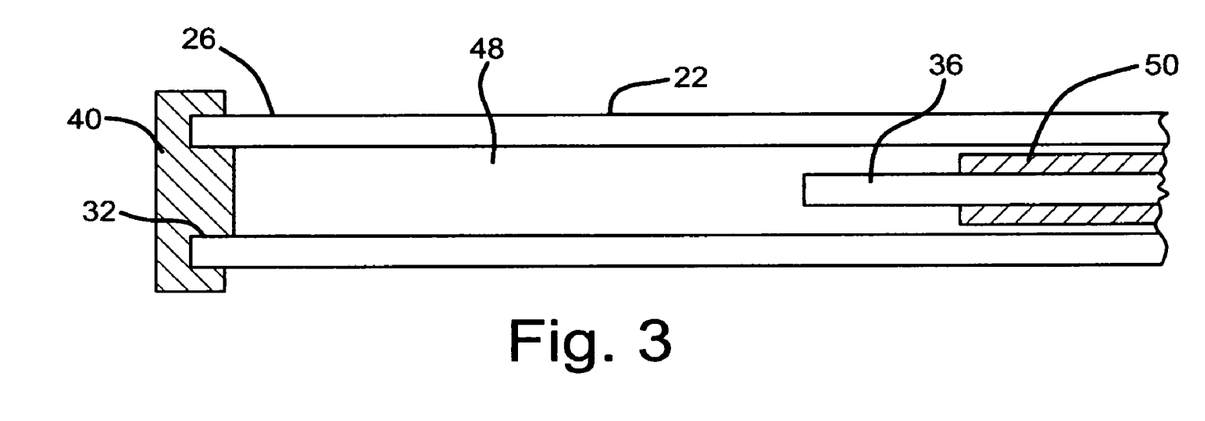
FIG. 3 is a cross-sectional view of a portion of the protective tube, shown separately and apart from the gasket, displaying the end of the tube adapted to be positioned nearest the engine combustion aperture, corresponding to the view of FIG. 2.
Figure 4:
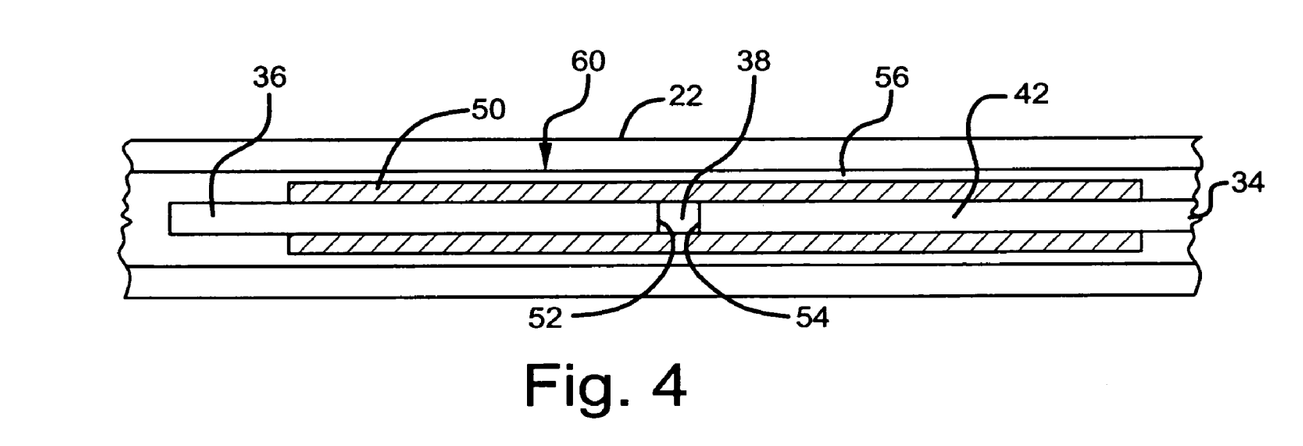
FIG. 4 is a cross-sectional view of an intermediate portion of the protective tube, also shown separately and apart from the gasket, displaying the pressure sensor apparatus contained within the metal tube.
Figure 5:
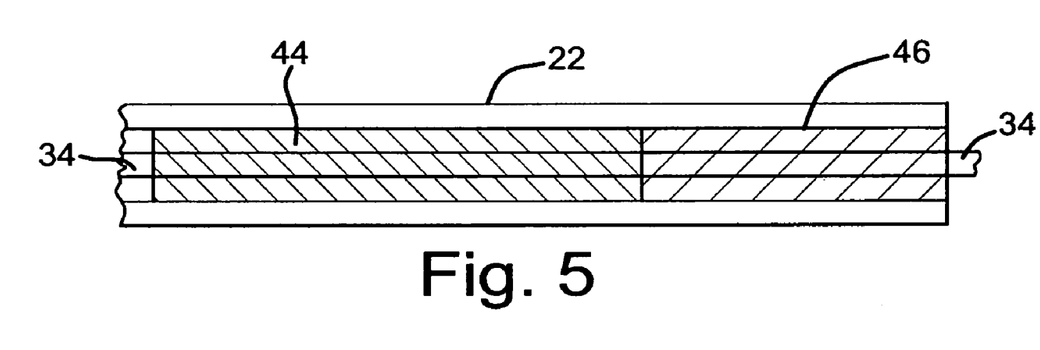
FIG. 5 is a cross-sectional view of an end of the protective tube opposite the end positioned near the engine combustion aperture, displaying features related to the protection of the sensor mechanism.
Figure 6:
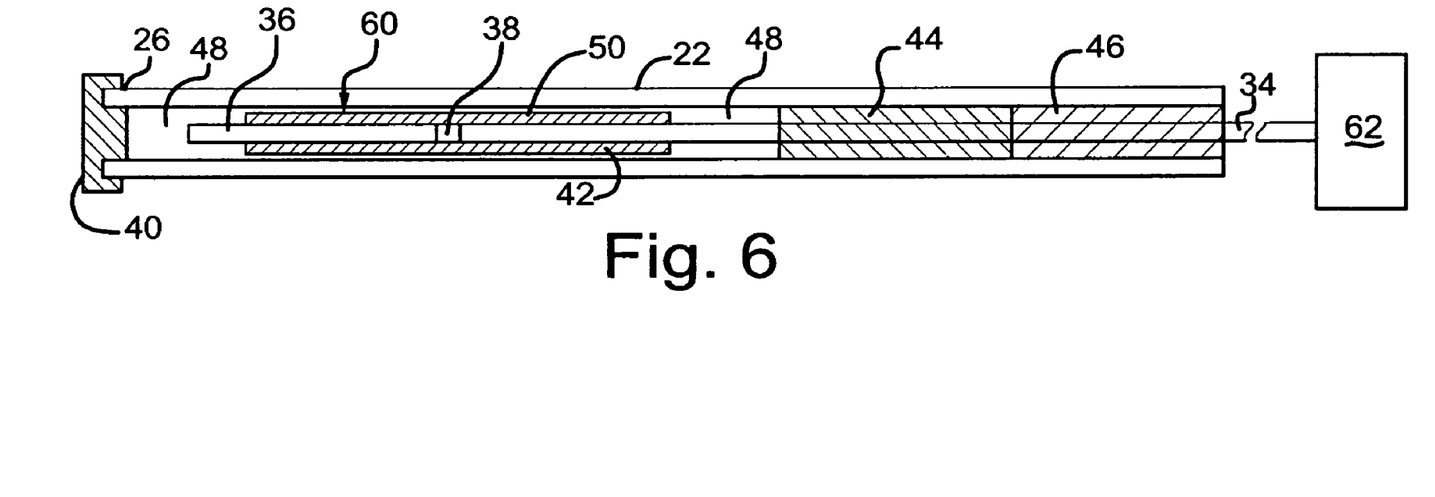
FIG. 6 is a cross-sectional view of the entire length of the protective metal tube, including all sections of the tube as displayed in FIGS. 3, 4, and 5.

Referring now to FIGS. 3, 4, 5, and 6, the pressure sensor apparatus 60 may specifically be described. Each of the FIGS. 3, 4, and 5, displays only a partial section of the tube 22, while FIG. 6 shows the entire length of the protective metal tube 22. It will be apparent that the combustion boundary end 26 of the metal tube 22, shown in most detail in FIG. 3, is the end protruding toward the combustion aperture 12 in FIG. 2. On the other hand, an incoming fiber optic cable wire 34 is shown at the extreme opposite end of the tube 22 in FIG. 5. Intermediately positioned between noted ends of the tube 22, FIG. 4 provides a detailed view of the sensor apparatus 60 that consists primarily of a silica tube 50 which houses a strand of reflective fiber optic cable wire 36, spaced by a gap 38 from a reflective end 42 of the incoming fiber optic cable wire 34. The cable wire strand 36 and the reflective end 42 are fused via high temperatures to the internal diameter of the silica tube 50 so as to fix the gap 38. The respective spaced parallel ends 52 and 54 of the latter members are squared with respect to one another, as shown, so as to enable changes in intensity of light emitted through the incoming cable wire 34 to be measured with great accuracy.

Figure 9A:
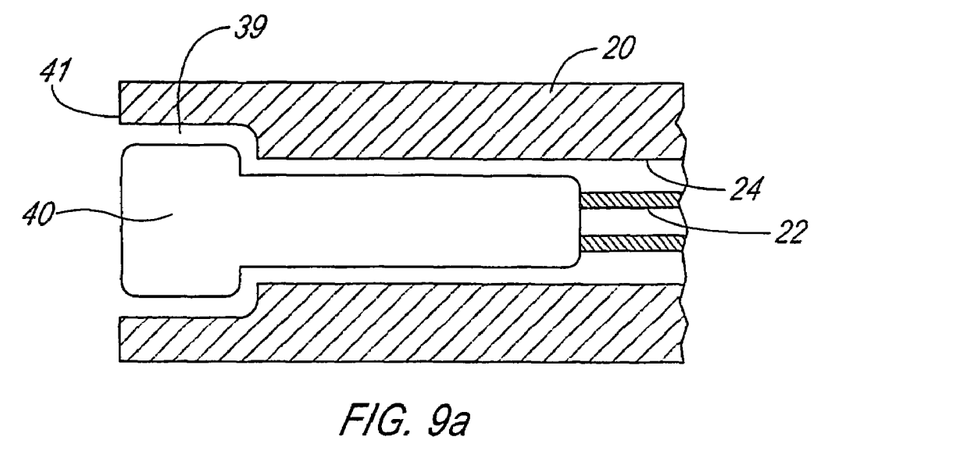
FIGS. 9a-9d are alternative embodiments to achieve adequate sealing of the sensor tube adjacent to a combustion bore opening.

Referring specifically now to FIG. 3, an interior bore 32 of the combustion end 26 of the tube 22 is adapted for receiving a metallic pressure diaphragm 40, similar to an end cap, by which combustion pressure may be received and transmitted through a fluid medium, such as a column of oil 48, to the sensor apparatus 60. In the described embodiment, the diaphragm is manufactured of nickel alloy metal to provide appropriate characteristics of heat resistance and pressure transmission for the intended environment. Due to the miniature size of the pressure diaphragm 40, the diaphragm is also referred to as a micro-bellows mechanism. For example, FIG. 9a shows an enlarged view of tube 24 that is provided with a diaphragm 40 at combustion end 26. Diaphragm 40 fits within a chamber 39 formed located adjacent to combustion opening 12. Alternatively, diaphragm 40 may be press fit into groove 24 and onto end of tube 22 to properly seal metal tube 22 against the wall 41 of combustion aperture 12.

Figure 9B:
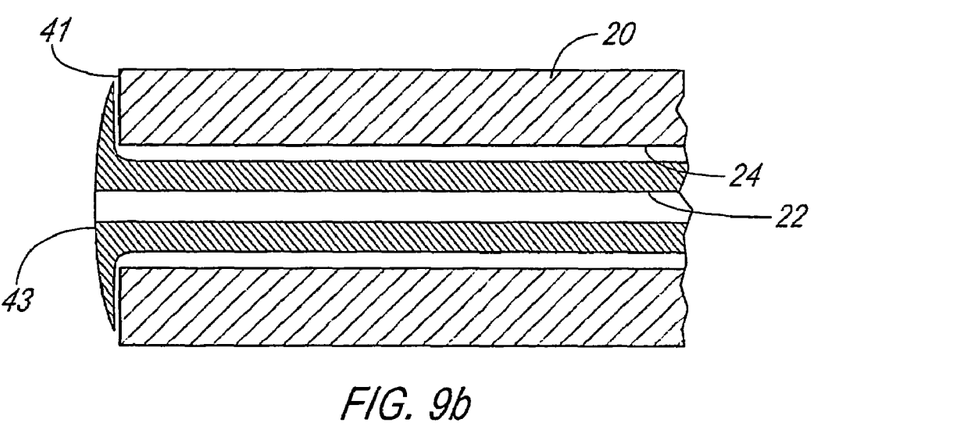

Referring to FIG. 9b, in an alternative embodiment to use of diaphragm 40, tube 24 may be provided with a trumpet type distal end 43. In this embodiment, trumpet type distal end 43 engages the wall 41 of combustion aperture 12. Ideally, distal end 41 is sized so as to be slightly larger than the diameter of groove 24 so as to seal around groove 24.

Figure 9C:
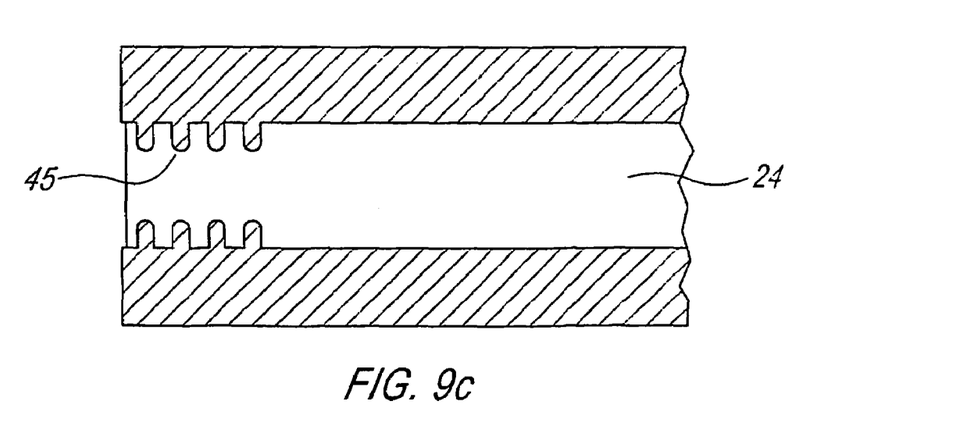

In yet another alternative embodiment, referring now to FIG. 9c, a portion of groove 24 is proved with a plurality of "teeth" 45 or threads to provide localized contact pressure and create several pressure barriers around tube 22. The teeth 45 are positioned adjacent to the combustion aperture 12.

Figure 9D:
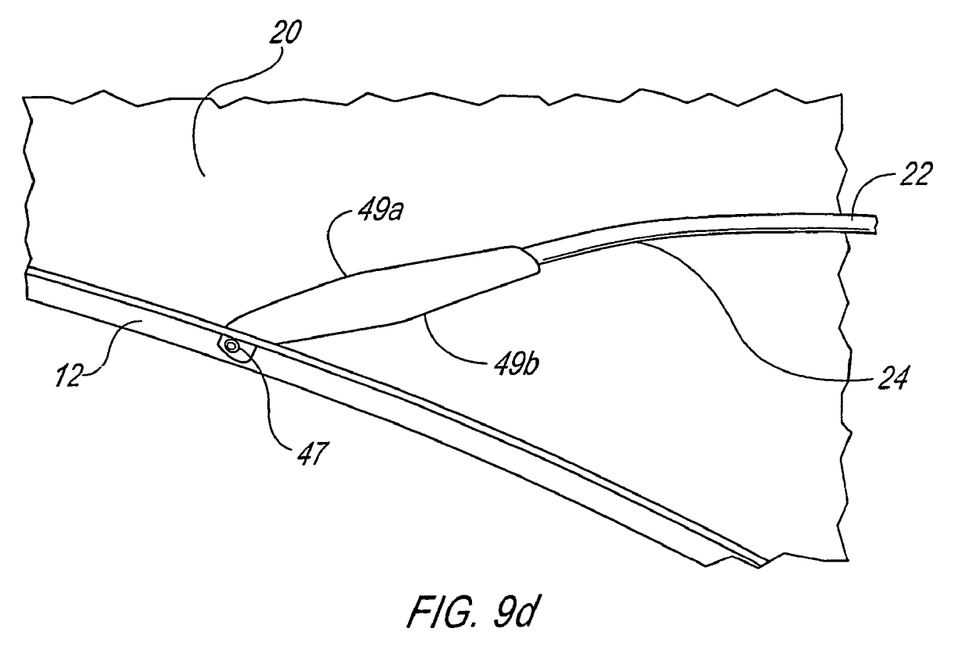

In yet another alternative embodiment, referring now to FIG. 9d, an end portion 47 of tube 22 may provided with triangular shape such that edges 49a and 49b extend away from one another. In accordance with this aspect of the invention, end portion 47 is press fit into groove 24, thereby sealing tube 22 within groove 24.

Referring now to FIG. 5, it will be noted that downstream of the sensor apparatus 60 is positioned a so-called wick stop material 44 installed during manufacture to arrest wicking of any high temperature adhesive material 46 into the oil entrained portion of the tube 22. Thus referring specifically to FIG. 6, it will be noted that the oil-entrained columns 48 are both upstream and downstream of the sensor apparatus 60. Those skilled in the art will appreciate that the high temperature oil 48 must be of a type not subject to significant thermal expansion. One such as choice is a so-called diffusion pump type of oil. Another is a silicone brake fluid such as that used in automotive brake systems, and subject to temperatures of up to at least 400 degrees Fahrenheit. The wick stop material 44 in the described embodiment is of a high temperature RTV elastomer, and is used because the high temperature adhesive material 46 is applied in a fluid state during the manufacturing process.

Referring now to FIGS. 4 and 6, it will be appreciated that the sensor apparatus 60 incorporates a silica tube 50 that floats in the oil column 48 within an intermediate portion of the tube 22. In the described embodiment, there is no adhesion or attachment in the interface 56 (FIG. 4) between the silica tube 50 and the metal protective tube 22. The metal protective tube 22 is thus free to expand and contract in the engine environment relative to the apparatus 60.

Finally, those skilled in the art will appreciate that the optical signals generated by means of the sensor apparatus 60 are created by virtue of fluctuating changes in the gap 38 caused by responses of the pressure diaphragm 40 to combustion activity occurring within the cylinders 12. As appreciated by one skilled in the art, changes in pressure adjust the overall axial length of the silica tube 50, thereby changing the distance of the gap 38 between the cable wire strand 36 and the reflective end 42 of the incoming fiber optic cable wire 34. Such signals must ultimately however be converted into electrical signals for purposes of being read appropriately by an engine control module 62 (FIG. 6) for providing real-time engine management, including optimization of fuel economy and emissions levels.

Figure 8:
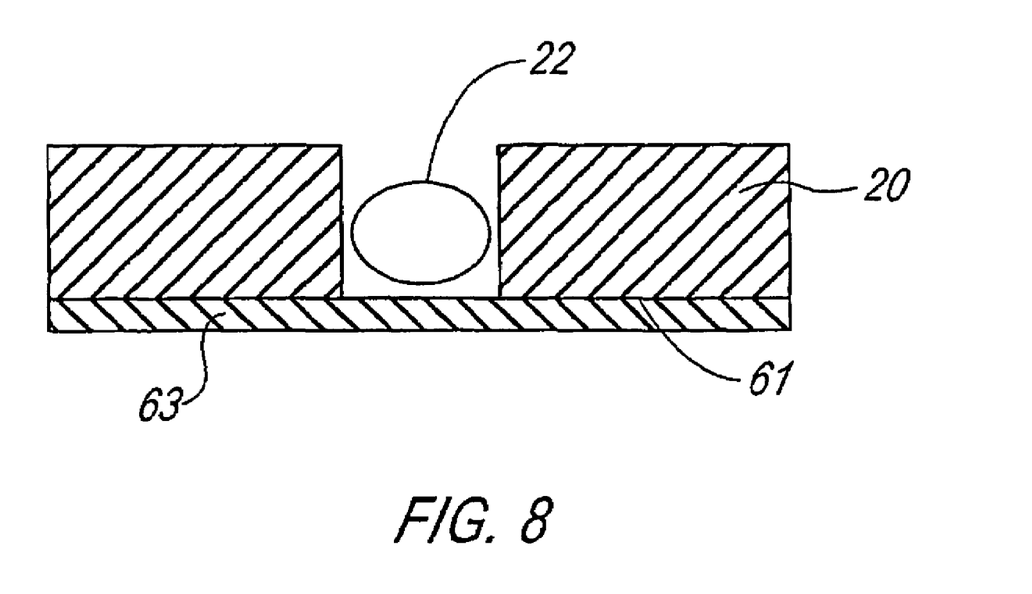
FIG. 8 is a cross-sectional view of another alternative embodiment of the groove formed in the spacer layer of the gasket.

The process for manufacturing a spacer layer 20 having at least one groove 24 will be discussed. First, groove 24 is rough cut into spacer layer 20. If groove 24 is only formed in a single spacer layer 20, then at least one surface 61 of spacer layer 20 is preferably provided with a thin support layer 63, as shown in FIG. 8. Thin support layer 63 may be attached to spacer layer 20 by spot welding or other suitable method. Once the rough cut groove 24 is formed, final shaping must be performed. Final shaping may be accomplished by either milling, saw blading a path, beading, or coining to the final shape.

It is desirable that an adequate seal is provided between the wall of groove 24 and an outer surface of tube 22. Even if the tolerances are tightly controlled between metal tube 2 and the groove wall 24, microsealing is desired. There are several different methods that are desirable to provide the sealant coating in groove 24. One method includes applying sealant coating to a flat layer before the groove is formed. However, use of this method requires that groove 24 must be formed through use of a forming process as opposed to a machining process. Alternatively, the sealant coating may be applied after the groove 24 is formed, through use of a screen printing process.

In another alternative embodiment, the sealant coating may be applied directly to metal tube 22 prior to insertion of metal tube 22 into groove 24. Due to the conformability of the sealant coating, once metal tube 22 is placed in groove 24, the coating will seal any gap between the wall of the groove 24 and metal tube 22. Many different types of coatings may be employed to affect the sealing between the groove 24 and the metal tube 22. Suitable coatings include FKM based coatings, thermoplastic, cement (must be applied in a fluid stage and cured after sensor is assembled) and foam-like coatings.

It is to be understood that the above description is intended to be illustrative and not limiting. Many embodiments will be apparent to those of skill in the art upon reading the above description. For example, a gasket within the sensor elements and wires molded into the body of the gasket material would fall within the broader scope of this invention. Therefore, the scope of the invention should be determined, not with reference to the above description, but instead with reference to the appended claims, along with the full scope of equivalents to which such claims are entitled.

What is claimed is:

1. A combustion pressure sensor in a cylinder head gasket adapted for use in an internal combustion engine, the gasket defining at least one combustion cylinder bore aperture, the sensor adapted for placement at a boundary of the bore aperture; wherein the sensor is adapted to measure combustion pressure changes within a cylinder bore of the engine for determining engine conditions including predetonation, said sensor and said gasket, comprising:
    a groove located within said gasket, said groove at least partially extending through said gasket at a first diameter, wherein said groove diameter increases to a second diameter adjacent said at least one combustion cylinder bore aperture to define a chamber; and
    a diaphragm having a inner first portion connected to a tube within said first diameter portion of said groove, and an outer second portion that is connected to said inner first portion, wherein said outer second portion has a larger diameter than said first diameter of said groove, said outer second portion being entirely housed within said chamber.

2. The combustion pressure sensor and gasket of claim 1, wherein said diaphragm inner first portion has an outer diameter greater than an outer diameter of said tube.

3. The combustion pressure sensor and gasket of claim 1, wherein said diaphragm has a complementary shape to said chamber.

4. A combustion pressure sensor and gasket adapted for use in an internal combustion engine, the gasket defining at least one combustion cylinder bore aperture, the sensor adapted for placement at a boundary of the bore aperture; wherein the sensor is adapted to measure combustion pressure changes within a cylinder bore of the engine for determining engine conditions including predetonation, said sensor and said gasket, comprising:
    a groove located within said gasket and a tube located within said groove, said groove comprising a plurality of inwardly extending, circumferential teeth located within said groove adjacent said combustion cylinder bore aperture and in contact with said tube.

5. The combustion pressure sensor and gasket of claim 4, wherein said teeth are integrally formed and one-piece with said groove.

6. The combustion pressure sensor and gasket of claim 4, wherein said teeth are threads.

7. The combustion pressure sensor and gasket of claim 4, wherein said plurality of teeth create several pressure barriers about said tube.

8. A combustion pressure sensor and gasket adapted for use in an internal conbustion engine, the gasket defining at least one combustion cylinder bore bore aperture, the sensor adapted for placement at a boundry of the bore aperture; wherein the sensor is adapted to measure combustion pressure changes within a cylinder bore of the engine for determinig engine conditions including predetonation, said sensor and said gasket, comprising:
    a groove located within said gasket and tube located within said groove, wherein a portion of said tube located adjacent said combustion cylinder bore aperture has laterally opposed edges that extend away from one another.

9. The combustion pressures sensor and gasket of claim 8, wherein said portion of said tube is press-fit into said groove to seal said tube within said groove.

10. The combustion pressure sensor and gasket of claim 8, wherein said portion of said tube has a generally outwardly extending triangular shape.

11. A combustion pressure sensor in a cylinder head gasket adapted for use in an internal combustion engine, the gasket defining at least one combustion cylinder bore aperture, the sensor adapted for placement at a boundary of the bore aperture; wherein the sensor is adapted to measure combustion pressure changes within a cylinder bore of the engine for determining engine conditions including predetonation, said sensor and said gasket comprising:

a groove extending through said gasket at a first diameter, said groove extending to an opening in said combustion cylinder bore aperture, said gasket defining a circumferential wall about said opening; and a tube extending through said groove and at least partially into said combustion cylinder bore aperture, said tube having an integrally formed curvilinear distal end positioned about said circumferential wall.

12. The combustion pressure sensor and gasket of claim 11, wherein said distal end is a flared trumpet-type distal end.

13. The combustion pressure sensor and gasket of claim 12, wherein said wall about said opening is larger than the flared distal end of said tube.

* * * * *